United States Patent [19]

Anderson et al.

[11] 4,240,582

[45] Dec. 23, 1980

[54] CENTER PIVOT IRRIGATION SYSTEM WITH CORNER WATERING ARRANGEMENT

[75] Inventors: John L. Anderson, Columbus, Nebr.; John C. Davidson, Alexandria, Minn.; Henry W. Schaaf, Madison; Charles H. Meis, Genoa, both of Nebr.

[73] Assignee: Lindsay Manufacturing Company, Lindsay, Nebr.

[21] Appl. No.: 83,302

[22] Filed: Oct. 10, 1979

Related U.S. Application Data

[62] Division of Ser. No. 801,099, May 27, 1977.

[51] Int. Cl.³ ............................................... B05B 3/12
[52] U.S. Cl. .............................. 239/11; 239/DIG. 1; 239/177; 239/710
[58] Field of Search .................... 239/DIG. 1, 11, 177, 239/212, 99; 137/344

[56] References Cited

U.S. PATENT DOCUMENTS

| 2,604,359 | 7/1952 | Zybach | 239/177 |
|---|---|---|---|
| 3,352,493 | 11/1967 | Curtis | 239/177 |
| 3,589,604 | 6/1971 | Paul | 239/11 |
| 3,608,826 | 9/1971 | Reinke | 239/177 |
| 3,628,729 | 12/1971 | Thomas | 239/177 |
| 3,750,953 | 8/1973 | Reinke | 239/177 |
| 3,797,517 | 3/1974 | Kircher et al. | 137/344 |
| 3,802,627 | 4/1974 | Seckler et al. | 239/212 |
| 3,902,668 | 9/1975 | Daugherty et al. | 239/177 |
| 3,921,908 | 11/1975 | Zimmerer | 239/177 |
| 3,979,062 | 9/1976 | Christensen et al. | 239/11 |
| 4,011,990 | 3/1977 | Meis et al. | 239/11 |
| 4,033,508 | 7/1977 | Jacobi et al. | 239/177 |
| 4,161,292 | 7/1979 | Holloway et al. | 239/177 X |

*Primary Examiner*—Robert W. Saifer
*Attorney, Agent, or Firm*—Kinzer, Plyer, Dorn & McEachran

[57] ABSTRACT

This is concerned with a so-called center pivot irrigation system in which a string of pipe is supported on wheeled towers at intervals and pivots about a so-called center pivot or water supply either intermittently or continuously so that it waters or irrigates a generally circular area. This is more specifically concerned with an arrangement and a control for watering the corners or noncircular area of a field in a manner which is greatly simplified over a number of previous approaches.

14 Claims, 6 Drawing Figures

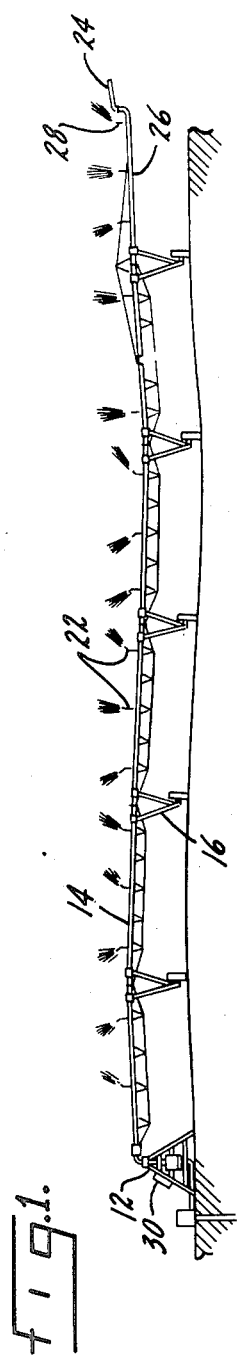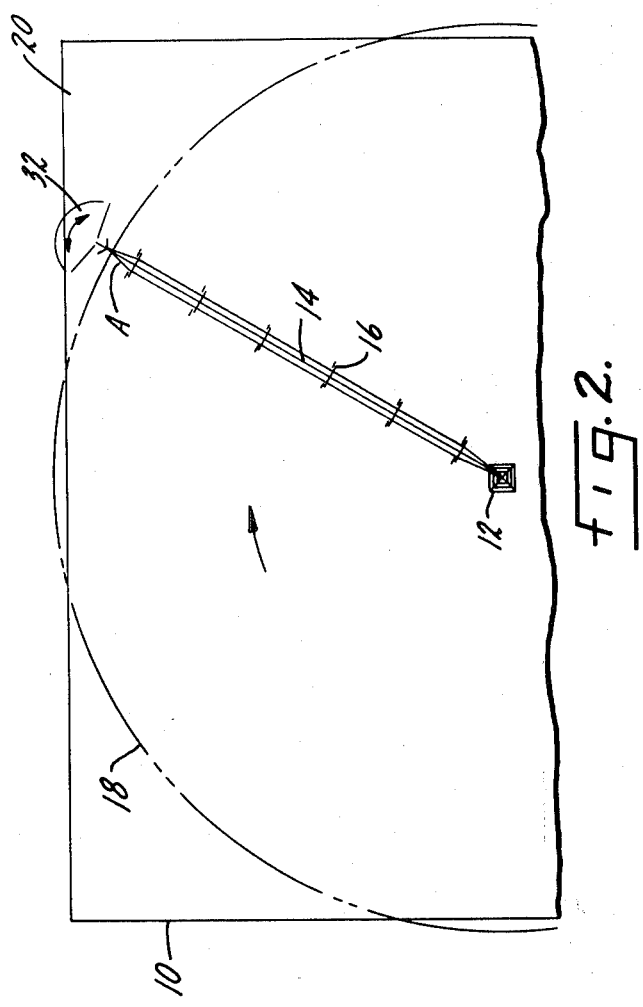

CENTER PIVOT IRRIGATION SYSTEM WITH CORNER WATERING ARRANGEMENT

This a division of application Ser. No. 801,099 filed May 27, 1977.

SUMMARY OF THE INVENTION

This is concerned with a center pivot irrigation system and is more specifically directed to a corner watering arrangement.

A primary object of the invention is a method and apparatus for watering the corners of a field with a center pivot irrigation system.

Another object is a unit of the above type having an enlarged end gun which is cyclically controlled in a specific manner for watering the corners of a field.

Another object is a method of operating a center pivot irrigation system which insures uniform application of water, both in the main circle, as well as in the corners of a field.

Another object is a corner watering gun for a center pivot irrigation system with a control that insures a near uniform application of water to most of the corner area.

Another object is a method of operating a center pivot irrigation system with a corner watering gun on the end thereof that operates in a novel and unique manner.

Other objects will appear from time to time in the ensuing specification and drawings.

BRIEF DESCRIPTION OF THE DRAWINGS

FIG. 1 is a diagrammatic illustration of a typical center pivot irrigation system with a corner watering mechanism diagrammatically indicated thereon; and FIGS. 2-6 are diagrammatic illustrations of a number of operative positions of the mechanism of FIG. 1.

DESCRIPTION OF THE PREFERRED EMBODIMENTS

Figure 3:
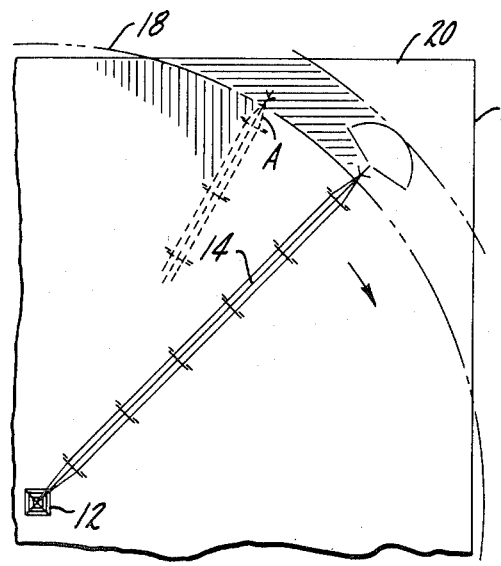

FIGS. 1 and 2 are diagrammatic views of a typical center pivot irrigation system in which a field, indicated generally at 10, of any suitable size, has a center pivot at 12 disposed generally in the center thereof, with a suitable pipeline extending outwardly therefrom, as at 14, supported at intervals by movable towers 16, each of which may be self-propelled or otherwise so that a generally circular area 18 is irrigated by the system. A circular system of this nature cannot irrigate the corners 20 of a square field, which amounts to a substantial loss in acreage, something on the order of 20 percent of the total. The pipeline itself may have a plurality of spaced sprinkler units 22 thereon at suitable intervals to irrigate the circular area 18.

To irrigate the corners 20, an enlarged end or corner gun, indicated diagrammatically at 24, is disposed on the outer end and may be mounted on the end of the normal overhang or extension 26 on the end or beyond the last tower.

The corner gun 24 is to be distinguished from the regular end guns 28 which are conventionally used on the end or overhang 26 of a center pivot system. Such normal end guns 28 have a very limited spray pattern and only project or cover, say, about 70 ft., beyond the end of the pipeline. In the arrangement shown, the enlarged or corner gun 24 is substantially larger in size and effectiveness and, under full pressure, is arranged and constructed to project water substantially farther into the corners 20, say, for example, 160 ft. beyond the end of the pipeline.

The arrangement has a control which will shut down the regular sprinklers 22 from time to time according to a certain program explained hereinafter. Each such sprinkler could have a control valve for this purpose. Or one solenoid valve might control individual hydraulic valves, for example water, at each of the sprinklers. The corner gun 24 should have a similar control, for example a control valve, so that it may be selectively turned off and on. Or it might be hydraulic. A control box 30 is shown at the center pivot for this purpose and while the details of a particular electric or control circuit have not been shown, it should be understood that the valves may be electrically or hydraulically or otherwise controlled and operated by limit switches at the center pivot which are opened or closed by a suitably contoured cam so that as the pipeline pivots, the operation of the regular sprinkler valves and enlarged corner gun may be suitably controlled according to a present pattern, all of which in detail may be conventional and is not important here.

The pattern or method of operation will be explained in connection with FIGS. 2-6 and it may be assumed that the normal direction of rotation of the center pivot is clockwise, as indicated by the arrow in FIG. 2. It will be noted in FIG. 2 that the center pivot has swung or moved past one side of the field and is approaching or entering the corner 20. At a suitable point, indicated at A, the control, be it at the center pivot or otherwise, will bring the pipeline to a stop. Then, all of the sprinklers 22 and the regular end guns 28 will be turned off. At or about the same time the corner gun 24 will be turned on and will sweep or pan through a certain pattern or arc 32 in FIG. 2 for a certain period of time, for example thirty minutes, with the pipeline stationary and inoperative.

Figure 4:
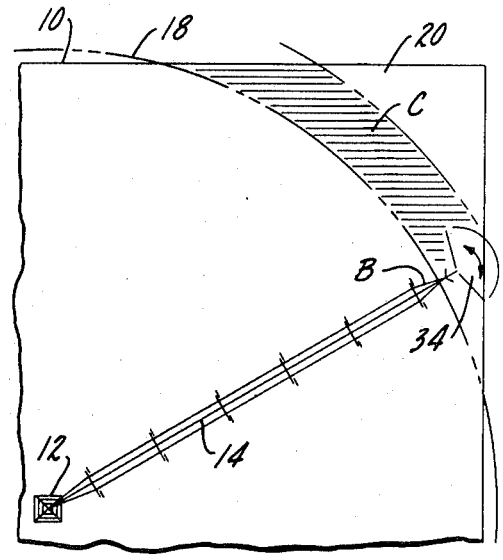

At the completion of this time period, whatever it is, the pipeline will start its forward movement, in a clockwise direction in FIG. 2, and will move past the corner, as shown in FIG. 3, to a suitable point B in FIG. 4 where it is leaving or just about to leave the corner. During this movement from point A to point B, the corner gun is energized and sweeping to irrigate area C, as shown by the pattern in FIG. 4. The regular sprinklers 22 and 26 on the pipeline remain deenergized. Thus during the stationary period of the pipeline, shown in FIG. 2 at point A with the corner gun sweeping, at 32, and also during the movement of the pipeline from point A in FIG. 2 to point B in FIG. 4, the full pressure of the water from the pump will be supplied to and effective at the corner gun 24, since the regular sprinklers and regular end guns 28 will be inoperative.

When the system arrives at point B, movement stops and the unit remains in this position for a certain period of time, for example thirty minutes, with the corner gun 24 sweeping through an arc 34 which may be the same as the initial arc 32, shown in FIG. 2. During this dwell period at point B, the normal sprinklers and normal end guns are deenergized so that the full water pressure is supplied to the corner gun.

Figure 5:
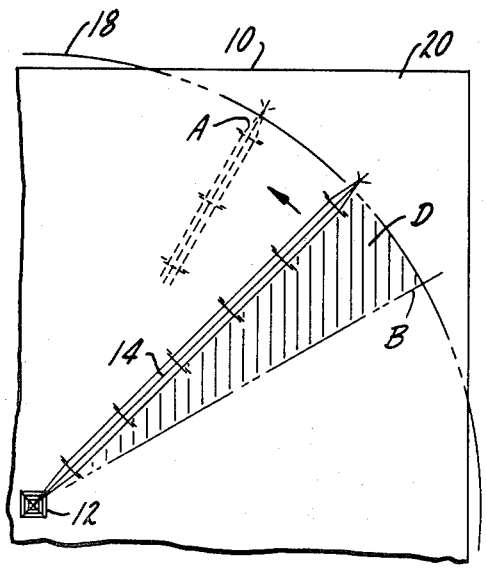
Figure 6:
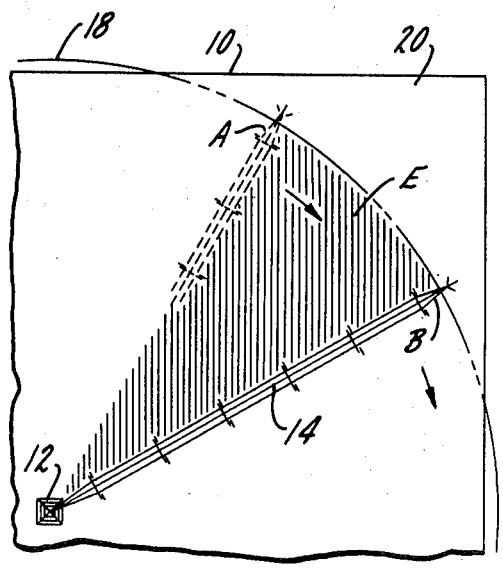

After thirty minutes, or whatever time period is used, the control system turns off corner gun 24, turns on the regular sprinklers 22 and the end guns 28, and reverses movement of the towers so that the pipeline moves back through the corner, as shown in FIG. 5, back to the A position at an accelerated rate of speed, for example twice the normal speed of the system. During this reverse pass, the regular sprinklers will be operating and the corner gun will not. Thus the area D within the circle will be irrigated but at one half the normal or desired rate since the system may be moving at twice its normal rate of speed. When the pipeline gets back to point A, the machine reverses direction again and starts a third pass, in a clockwise direction back past the corner, as shown in FIG. 6. During this third pass, the normal sprinklers 22 and end gun 28 are operating, the corner gun 24 is not operating, and the towers are moving at an accelerated rate of speed, say twice the normal rate of speed, so that the area in the circle has a full or normal water supply, as indicated by shading E. When the unit reaches point B again, the machine slows down to its normal rate of speed and continues past the side of the field in what may be considered normal operation, with the sprinklers 22 operating and the normal end guns 28 either operating or not, as desired. When the machine arrives at the next corner, it may go through the same cycle, a first pass from point A to point B at normal speed with only the volume or corner gun operating and dwell periods at each end, a reverse pass at an accelerated rate of speed with only the regular sprinklers and possibly the regular end guns operating, and a third pass in the normal direction at an accelerated rate of speed with only the normal sprinklers operating. Full or relatively constant water pressure is supplied at all times, which is important.

The use, operation and function of the invention are as follows:

The invention may be considered to be or include the use or operation, as well as the structure of a center pivot irrigation system which has an enlarged gun on the end thereof constructed and arranged to project water beyond the normal end pattern of such a system by a distance of, say, 150 ft. or thereabouts. The arrangement or system also includes a control, the details of which may be conventional, for turning various sprinklers off and on, for activating the enlarged gun from time to time, and for moving the center pivot back and forth in a certain manner at various speeds to acomplish certain results.

In the arrangement shown, the center pivot unit will be moving normally as it goes past the side of a field in FIG. 2 until it reaches a certain selected point A where it may be considered to be entering the corner. The unit stops, the regular sprinklers are deactivated, and the enlarged gun comes on. The unit is stationary while the corner gun sweeps for a certain period of time, for example thirty minutes. Then the pipe string starts up again and moves through the corner to a second selected point B which may be considered to be at or near the end of the corner. This may be considered the first pass and during this movement the regular spinklers are deenergized and the enlarged gun is operating so that a substantial part of the corner is irrigated. At the exit point B, the unit stops and the enlarged gun sweeps through a certain pattern with the regular sprinklers still deenergized. After a certain period of time, say thirty minutes, the pipe string reverses direction and moves back through the corner, from point B to point A, at an increased rate of speed. During this second or reverse pass, the normal sprinklers are operated and the enlarged gun is turned off. When the string gets back to the entrance point A, the unit reverses direction and goes back through the corner, again at the increased rate of speed, with the regular sprinklers operating and the enlarged gun off. When the unit gets back to the exit point B, it slows down to its regular speed and moves past the next side of the field with the normal sprinklers operating in their regular manner and the enlarged gun deenergized. The unit thus makes three passes by the corner, the first one in a forward direction with the enlarged gun operating and the normal sprinklers shut down, the second in a reverse direction at an increased rate of speed with the enlarged gun shut down and the regular sprinklers operating, and the third in the forward direction at the increased rate of speed with the regular sprinklers operating and the enlarged gun shut down. During any one or all of these three passes, the normal end guns, which have a rather limited trajectory beyond the end of the pipeline, may be turned off or on at any suitable time or any portion of a pass as desired.

It will be noted that during the second and third passes, the unit is moving at an accelerated speed. The object of this is so that the particular segment of the circle covered by the center pivot will not be overwatered. During these passes, the regular sprinklers will be delivering water at their regular rate and if both of these passes were at the normal speed of the mechanism, the segment would receive double the amount of water desired.

Whereas it has been stated that the method and apparatus is controlled from a cam arrangement at the center pivot through microswitches, it should be understood that it may be done in any suitable manner. For example, a post or certain actuators may be positioned at or adjacent the points A and B to engage a trip wire or actuator on the center pivot in any suitable manner. In short, the precise position and structure of the control is not considered important in detail.

Under certain circumstances, it might be advisable to have the enlarged gun operating both during the first and second passes with the unit moving at an accelerated rate of speed, so that the corner will not be overwatered. And only during the third pass would the enlarged gun shut down and the regular sprinklers come on with the center pivot unit slowing down to its normal rate of travel. But the first described procedure is preferred.

While it has been stated that the regular sprinklers are shut down when the enlarged gun is operating so that full water pressure will be supplied to the enlarged gun, under certain circumstances it may be desirable to mount a booster unit on the outermost tower, for example, such as a pump driven by a gasoline engine or an electric motor, to boost the pressure at the enlarged gun to increase its throw. But this is an option and may well depend upon the application. Also, the towers have been shown as mounted on wheels and it should be understood that treads or walking units might be used. Also, the towers could be electrically operated or water-driven, as desired. The precise details and structures of the towers, the arches or spans, and center pivot itself are not considered important in and of themselves.

The specific details of the controls for any of the described mode of operation may involve standard components, none of which has been shown in detail. The arrangement and method of operation in FIGS. 3 through 6 may be considered totally automatic. Using the enlarged gun may be most advantageously left to the judgment of the user, since it may be desirable to operate it only on quiet days when wind is not a factor. Also, the order of the passes in FIGS. 3–6 may be varied.

Whereas the preferred form and several variations of the invention have been shown, described and suggested, it should be understood that suitable additional modifications, changes, substitutions and alterations may be made without departing from the invention's fundamental theme.

The embodiments of the invention in which an exclusive property or privilege is claimed are defined as follows:

1. A method of operating a center pivot irrigation system which is constructed for irrigating a main circular area of a field and noncircular areas outside of the main circular area in which the system includes a string of pipe supported at intervals on wheeled towers and extending outwardly from and adapted to move around a center pivot with a series of sprinkler units on the pipe string and an enlarged end gun on the outer end of the pipe string directed generally radially outwardly therefrom to irrigate the noncircular areas, including the steps of moving the pipe string past a noncircular area for a first pass, reversing its direction of movement at the end of the noncircular area back to the beginning of the noncircular area for a second pass and then reversing its direction of movement again and moving it past the noncircular area again for a third pass thereby effecting three passes by the noncircular area, two forward and one reverse, operating the sprinkler units on the main pipe string but not the enlarged end gun during at least one of the three passes, and operating the end gun but not the sprinkler units during at least one of the other two passes so that virtually all of the water pressure in the pipe string will be applied to the end gun.

2. The method of claim 1 further characterized by and including the step of moving the pipe string in its reverse pass at a speed substantially greater than its speed during its normal pivoting movement.

3. The method of claim 1 further characterized by and including the steps of initially stopping movement of the pipe string at the beginning of an outside noncircular area, energizing the end gun and deenergizing the sprinkler unit while holding the pipe string stationary and sweeping the end gun across a certain arc covering a part of the noncircular area for a certain period of time, thereafter moving the pipe string past the noncircular area with the end gun energized and the sprinklers deenergized during a first pass so that virtually all of the water pressure in the pipe string is applied to the end gun, stopping the movement of the pipe string at the end of the noncircular area, holding the pipe string stationary and sweeping the end gun across a certain arc covering a part of the noncircular area for a certain period of time, thereafter reversing the direction of movement of the pipe string so that it moves past the noncircular area in a second pass back to the beginning in a reverse movement, deenergizing the end gun and energizing the sprinkler units during such reverse movement so that during the second pass the sprinkler units will be in operation and the end gun will be deenergized, stopping the pipe string when it arrives at the beginning of the noncircular area and reversing its movement again so that it moves back past the noncircular area again in a third pass and, during the third pass, continuing the operation of the sprinkler units on the main pipe string while maintaining the end gun inoperative.

4. The method of claim 3 further characterized by and including the steps of increasing the rate of movement of the pipe string during the second and third passes so that the sprinkling rate will be less than that normally applied to the portion of the circular area covered by the pipe string during its normal rate of movement when it is not opposite a noncircular area, and reducing the rate of movement of the pipe string at the end of the third pass to its normal rate of movement at the completion of the third pass to thereby resume the normal rate of travel of the pipe string across the field.

5. The method of claim 1 further characterized in that only the end gun is operated and not the sprinklers during the first pass, and the sprinklers and not the end gun are operated during the second and third passes.

6. The method of claim 1 further characterized in that the end gun and not the sprinklers are operated during the first pass and the second pass, and the sprinklers and not the end gun are operated during the third pass.

7. The method of claim 1 further characterized by stopping the pipe string at the beginning and end of a noncircular area for a certain period of time and sweeping the end gun over a certain arc while the pipe string is so stopped, with the sprinklers inoperative.

8. The method of claim 1 further characterized by and including the steps of stopping the pipe string at the beginning of a noncircular area, energizing the end gun and deenergizing the sprinklers while the pipe string is stopped for a certain period of time, sweeping the end gun to spray a certain area at the beginning of the noncircular area while the pipe string is stationary, thereafter resuming movement of the pipe string with the end gun energized and the sprinklers deenergized to effect the first pass of the noncircular area, stopping the pipe string at the end of the noncircular area for a certain period of time with the sprinklers deenergized and the end gun energized, and sweeping the end gun while the pipe string is so stopped over a certain portion at the end of the noncircular area.

9. In a center pivot irrigation system constructed to irrigate a main circular area and noncircular areas outside of the main circular area, the system including a string of pipe supported at intervals on movable towers and extending outwardly from and adapted to move around the center pivot, a series of sprinkler units on the pipe string for irrigating the circular area, an enlarged end gun on the outer end of the pipe string directed generally radially outwardly to irrigate the noncircular areas outside of the main circular area, means for energizing the enlarged end gun and for deenergizing the series of sprinkler units on the pipe string when the string is opposite a noncircular area so that virtually all of the water pressure in the pipe string may be supplied to the enlarged end gun to irrigate the noncircular areas, means for cyclically reversing the direction of movement of the pipe string adjacent the noncircular areas so that it will move past such area, reverse and go back by in reverse direction and reverse again to move in a forward direction again, thereby affecting at least three passes by the noncircular areas, and means for operating the series of sprinkler units on the pipe string during at least one of the three passes and for operating the enlarged end gun during at least one of the other two passes.

10. A method of operating a center pivot irrigating system which is constructed for a main circular area of a field and certain noncircular areas outside of the main circular area in which the system includes a string of pipes supported at intervals on movable towers and extending outwardly from and adapted to move around the center pivot at a certain normal rate of speed with two main irrigation devices thereon including a series of sprinkler units on the pipe string to irrigate the circular area and an enlarged corner gun of substantial capacity and trajectory on the outer end of the pipe string directed generally radially outwardly therefrom to irrigate the noncircular areas, including the steps of moving the pipe string past a noncircular area for a first pass, reversing its direction of movement at the end of the noncircular area and moving it back in a second pass generally to the beginning of the noncircular area, reversing its direction of movement again and moving it back past the noncircular area again for a third pass thereby effecting three passes by the noncircular area, moving the pipe string during two of the passes at a different rate of speed than the normal rate of speed and during the other pass at the normal rate of speed, and operating one of the irrigation devices during the said two passes and the other irrigation device during the said other pass so that the rate of water application will be generally the same in the noncircular area and the portion of the circular area opposite the noncircular area.

11. The method of claim 10 further characterized in that during the first pass the pipe string is moved at the normal rate of speed and the enlarged corner gun is operating and the series of sprinkler units are not operating.

12. The method of claim 10 further characterized in that during the said two passes the enlarged corner gun is operating and the series of sprinkler units are not operating, and during the said other pass the series of sprinkler units are operating and the enlarged corner gun is not operating.

13. The method of claim 10 further characterized in that during the said two passes the series of sprinkler units are operating and the enlarged corner gun is not operating and during the other pass the enlarged corner gun is operating and the series of sprinkler units are not operating.

14. The method of claim 10 further characterized by and including the step of performing the said two of the passes of the pipe string consecutively.

* * * * *